United States Patent
Shirakura et al.

(10) Patent No.: US 6,781,619 B1
(45) Date of Patent: Aug. 24, 2004

(54) PARALLAX IMAGE STRING PICKUP APPARATUS

(75) Inventors: Akira Shirakura, Tokyo (JP); Shigeyuki Baba, Tokyo (JP); Koji Ashizaki, Tokyo (JP); Nobuhiro Kihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/374,595

(22) Filed: Aug. 15, 1999

(30) Foreign Application Priority Data

Aug. 20, 1998 (JP) .......................... P10-234659

(51) Int. Cl.[7] .......................... H04N 15/00; G06K 9/00; G03H 1/26
(52) U.S. Cl. .......................... 348/46; 382/154; 359/23; 348/14.16
(58) Field of Search .............................. 348/40, 42, 43, 348/46, 47, 51, 59, 14.16; 382/154, 276; 359/22, 24, 25, 26, 30, 32, 23, 9, 900

(56) References Cited

U.S. PATENT DOCUMENTS

| | | | | |
|---|---|---|---|---|
| 4,783,133 A | * | 11/1988 | Chen .......................... | 359/23 |
| 6,018,403 A | * | 1/2000 | Shirakura et al. .............. | 359/23 |
| 6,108,440 A | * | 8/2000 | Baba et al. .................. | 382/154 |
| 6,236,475 B1 | * | 5/2001 | Kihara et al. ................. | 359/23 |
| 6,370,268 B2 | * | 4/2002 | Baba et al. .................. | 382/154 |

\* cited by examiner

*Primary Examiner*—Gims Philippe
(74) *Attorney, Agent, or Firm*—Sonnenschein, Nath & Rosenthal LLP

(57) ABSTRACT

A parallax image string pickup apparatus can attract the gaze of the person being shot to make it stable without making the person nervous about the camera operation when the person is shot from a plurality of different angles and, at the same time, provide the person or object 31 with necessary information for the shooting operation including the position of the person in the frame of the viewfinder of the camera of the camera unit 32 and other shooting conditions. The parallax image string pickup apparatus 1 includes a camera unit 32 screened from the object 31, and a half mirror 40 is arranged between the camera unit 32 and the object 31. As the half mirror 40 shows an image of the object 31, the gaze of the object 31 is attracted to the half mirror 40 before and during a shooting operation.

10 Claims, 11 Drawing Sheets

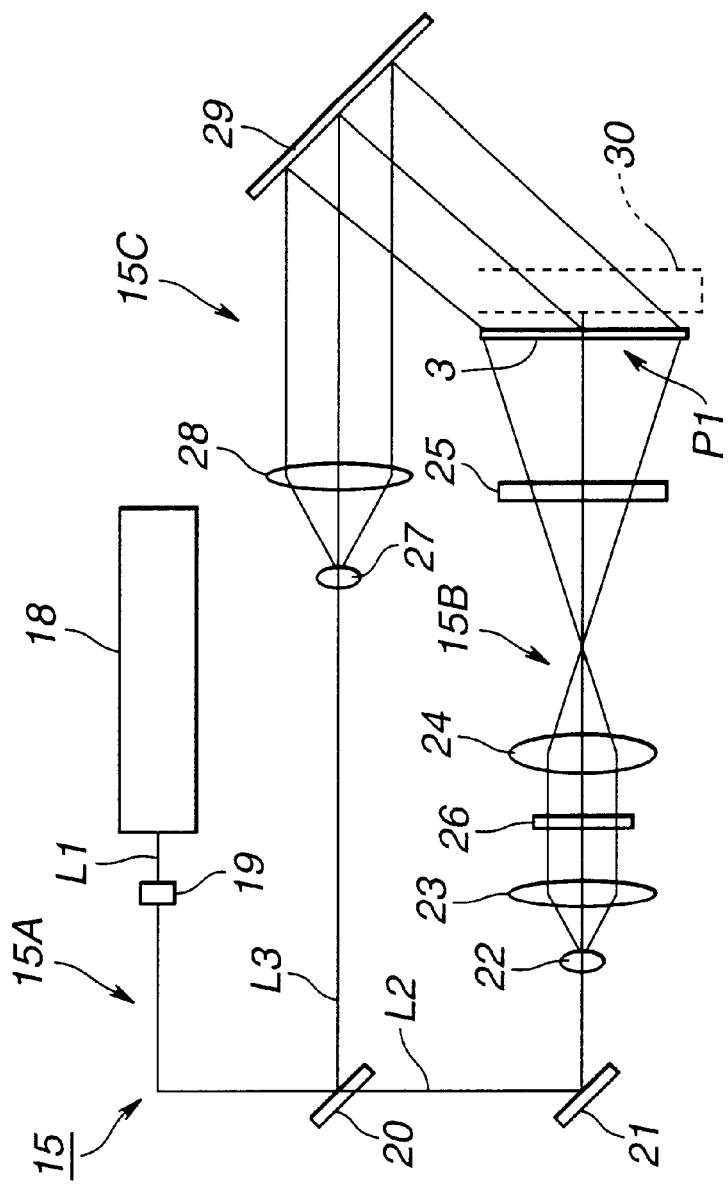
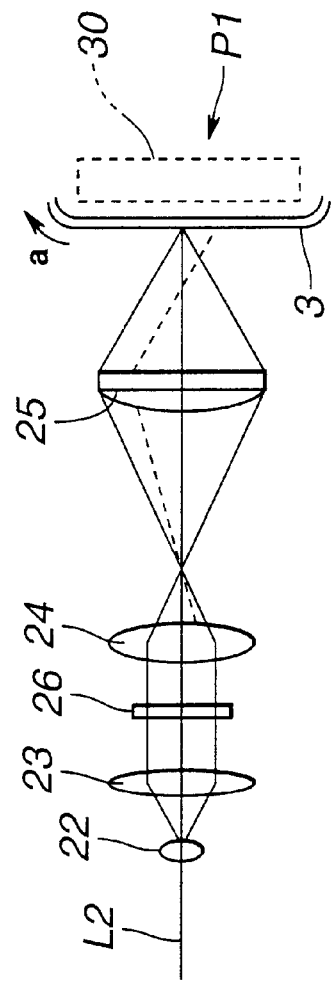
FIG.5A
FIG.5B

PARALLAX IMAGE STRING PICKUP APPARATUS

RELATED APPLICATION DATA

The present application claims priority to Japanese Application No. P10-234659 filed Aug. 20, 1998, which application is incorporated herein by reference to the extent permitted by law.

BACKGROUND OF THE INVENTION

1. Field of the Invention

This invention relates to a parallax image string pickup apparatus to be used for picking up parallax images of a scene from a plurality of different viewing angles.

2. Description of the Related Art

A holographic stereogram is produced as a result of sequential exposure and recording operations conducted for a large-number of original pictures obtained by photographically shooting an object from so many different viewing angles so as to record them as strip-shaped or dot-shaped element holograms on a recording medium. When the viewer watches a holographic stereogram with one of his or her eyes from a specific angle, he or she recognizes only a two-dimensional image that is a collection of pieces of information on part of each of the element holograms. When the viewer watches the holographic stereogram from another angle that is on the level of the first viewing angle, he or she then recognizes another two-dimensional image that is a different collection of pieces of information on part of each of the element holograms. However, when the viewer watches the holographic stereogram with both of his or her eyes, the recorded pictures are perceived by him or her as a three-dimensional image. A holographic stereogram as described above is normally prepared by means of holographic stereogram preparing apparatus 100 as shown in FIG. 1A of the accompanying drawings. Referring to FIG. 1A, the holographic stereogram preparing apparatus 100 comprises a laser source 101 adapted to emit a laser beam L1 showing a single wavelength and an enhanced level of coherence, a half mirror 102 for dividing the emitted laser beam L10 into an object beam L11 and a reference beam L12, optical parts 103 through 107 and display device 107 operating an optical system for the object beam L11 and a hologram recording medium 112 on which both the object beam L11 and the reference beam L12 are converged. It may additionally comprise an electrically driven stage 113.

The optical system of the object beam L11 specifically includes a total reflection mirror 103, a first cylindrical lens 104 for one-dimensionally diffusing the object beam L11, a collimator lens 105 for collimating the diffused object beam L11, a projector lens 106 and a second cylindrical lens 107 for leading the object beam L11 to the hologram recording medium 112 of/recording section P100. The above listed optical components are arranged in the above mentioned order along the optical axis of the object beam L11. The display device 108 comprises a transmission type liquid crystal panel arranged between the collimator lens 105 and the projection lens 106. As will be described hereinafter, the display device 108 is adapted to display an image formed on the basis of image data output from an image processing section (not shown).

The optical system of the reference beam 12 specifically comprises a cylindrical lens 109 for one-dimensionally diffusing the reference beam L12, a collimator lens 110 for collimating the diffused reference beam L12 and a total reflection mirror 111 for reflecting the reference beam L12 and leading it to the hologram recording medium 112. The above listed optical components are arranged in the above mentioned order along the optical axis of the reference beam L12.

The hologram recording medium 112 is typically a photosensitive film and, as shown in FIG. 1B, held to the electrically driven stage 113 so that it is intermittently driven to move in the direction of arrow c in FIG. 1B by the electrically driven stage 113.

As described above and shown in FIG. 1A, the laser beam L10 is emitted from the laser sourced 101 to strike the half mirror 102, where it is divided into the object beam L11 and the reference beam L12.

The object beam L11 is then made to enter the display device 108 by way of the cylindrical lens 104 and the collimator lens 105 and then, as it is transmitted through the display device 108, it is modulated according to the element image being displayed there. The modulated object beam L11 is then led to the hologram recording medium 112 located in the/recording section P100 by way of the projection lens 109 and the cylindrical lens 107. On the other hand, the reference beam L12 is led to the hologram recording medium 112 located in the/recording section P100 by way of the cylindrical lens 109, the collimator lens 110 and the total reflection lens 111.

Thus, the interference fringes generated as a result of interference of the object beam L11 modulated by the image displayed on the display device 108 and the reference beam L12 are sequentially exposed to light and recorded on the hologram recording medium 112 as strip-shaped or dot-shaped element holograms.

As described above, the image displayed on the display device 108 is formed from the image data output from the image processing section (not shown). The image is obtained by sequentially shooting an object from different angles by means of a parallax image string pickup apparatus (not shown) and appropriately processing the obtained images. The parallax image string pickup apparatus may comprise a single camera provided with a CCD (charge coupled device) and adapted to move one-dimensionally to shoot an object or a plurality of digital steel cameras adapted to shoot an object simultaneously.

A holographic stereogram is produced not necessarily from a single parallax image string but from parallax image strings obtained through a synthetic process using different pictures as disclosed in Japanese Patent Application Laid-Open No. 10-78742.

However, with a known parallax image string pickup apparatus having a configuration as described above, the camera unit for shooting an object is visible from the object, that may be a living person, so that the person being shot can become nervous about the operation of the camera. Additionally, such a known parallax image string pickup apparatus is not provided with a viewing target for attracting the gaze of the person being shot.

Therefore, when shooting a person with such a known parallax image string pickup apparatus, the gaze of the person being shot is often unstable and unnecessarily moving to consequently damage the effect of the obtained picture.

When shooting a person with such a known parallax image string pickup apparatus, it is desirable that the shooting conditions selected for shooting the person such as the position within the frame of the viewfinder are knowable to the person in order to make the produced holographic stereogram meet the demand of the person.

Particularly when the picture obtained by shooting a person with a parallax image string pickup apparatus is synthetically combined with another picture to produce a holographic stereogram, it is desirable that the person can imagine the final image that is produced by the picture synthesis.

In view of these circumstances, it is therefore the object of the present invention to provide a parallax image string pickup apparatus that can attract the gaze of the person being shot to make it stable without making the person nervous about the camera operation when the person is shot from a plurality of different angles and, at the same time, provide the person with necessary information including the position of the person in the frame of the viewfinder and other shooting conditions.

SUMMARY OF THE INVENTION

According to the present invention, the above object is achieved by providing a parallax image string pickup apparatus adapted to generate a parallax image string by shooting an object from a plurality of different angles, said apparatus comprising:

an image pickup means for picking up parallax images of the object; and a cover-up means to be arranged between the object and the image pickup means for covering up the image pickup means.

With a parallax image string pickup apparatus according to the invention and having the above described configuration, parallax images of the object are picked up by the image pickup means while the latter is hidden and not visible from the object. Thus, since a parallax image string pickup apparatus according to the invention is practically not visible from the object when the latter is being shot, the latter may not be aware of the image pickup means and hence would not unnecessarily move to damage the effect of the picture that will be finally produced.

Preferably, said cover-up means includes a half mirror or a total reflection mirror and an image of the object is produced on the half mirror or the total reflection mirror, whichever appropriate.

With the above arrangement, when the object is a living person, the gaze of the person being shot will be attracted by the image of his- or herself produced on the cover-up means and hence stabilized. At the same time, the position in the frame of the viewfinder of the camera of the parallax image string pickup apparatus and other shooting conditions are knowable to the person when the latter is being shot.

Thus, with a parallax image string pickup apparatus according to the invention, the image pickup means is practically not visible from the object that is a living person when the latter is being shot and hence the person will not be aware of the image pickup means. Additionally, with a parallax image string pickup apparatus according to the invention, the gaze of the person being shot would not unnecessarily move so that a good parallax image string will be obtained to prepare a holographic stereogram.

On the other hand, with a parallax image string pickup apparatus according to the invention, the cover-up means produces an image of the person being shot so that the person may be able to know the position in the frame of the viewfinder of the camera of the parallax image string pickup apparatus and other shooting conditions if his or her gaze is stabilized.

Additionally, with a parallax image string pickup apparatus according to the invention, the person being shot can imagine the final image of the holographic stereogram that is produced by picture synthesis if the obtained images are synthetically combined with other images.

Thus, a parallax image string pickup apparatus according to the invention can effectively eliminate undesirable accidents such as unnecessary motions on the part of the object to produce a high quality parallax image string.

BRIEF DESCRIPTION OF THE DRAWINGS

FIG. 4A shows an initial state, FIG. 4B shows a state of being exposed to light and FIG. 4C shows a fixed state.

FIG. 5 is a schematic illustration of the optical system of the holographic stereogram preparing apparatus of FIG. 2.

FIG. 6A shows a positional relationship of straight-ahead camera on straight track for the object and the camera unit and FIG. 6B shows a positional relationship of panning camera on straight track for the object and the camera unit, while FIG. 6C shows a positional relationship of re-centering camera on straight track for the object and the camera unit and FIG. 6D shows a positional relationship of rotating camera on rotating object for the object and the camera unit.

DETAILED DESCRIPTION OF THE INVENTION

Now, the present invention will be described in greater detail by referring to the accompanying drawings that illustrate preferred embodiments of the invention.

Figures 1A, 1B:
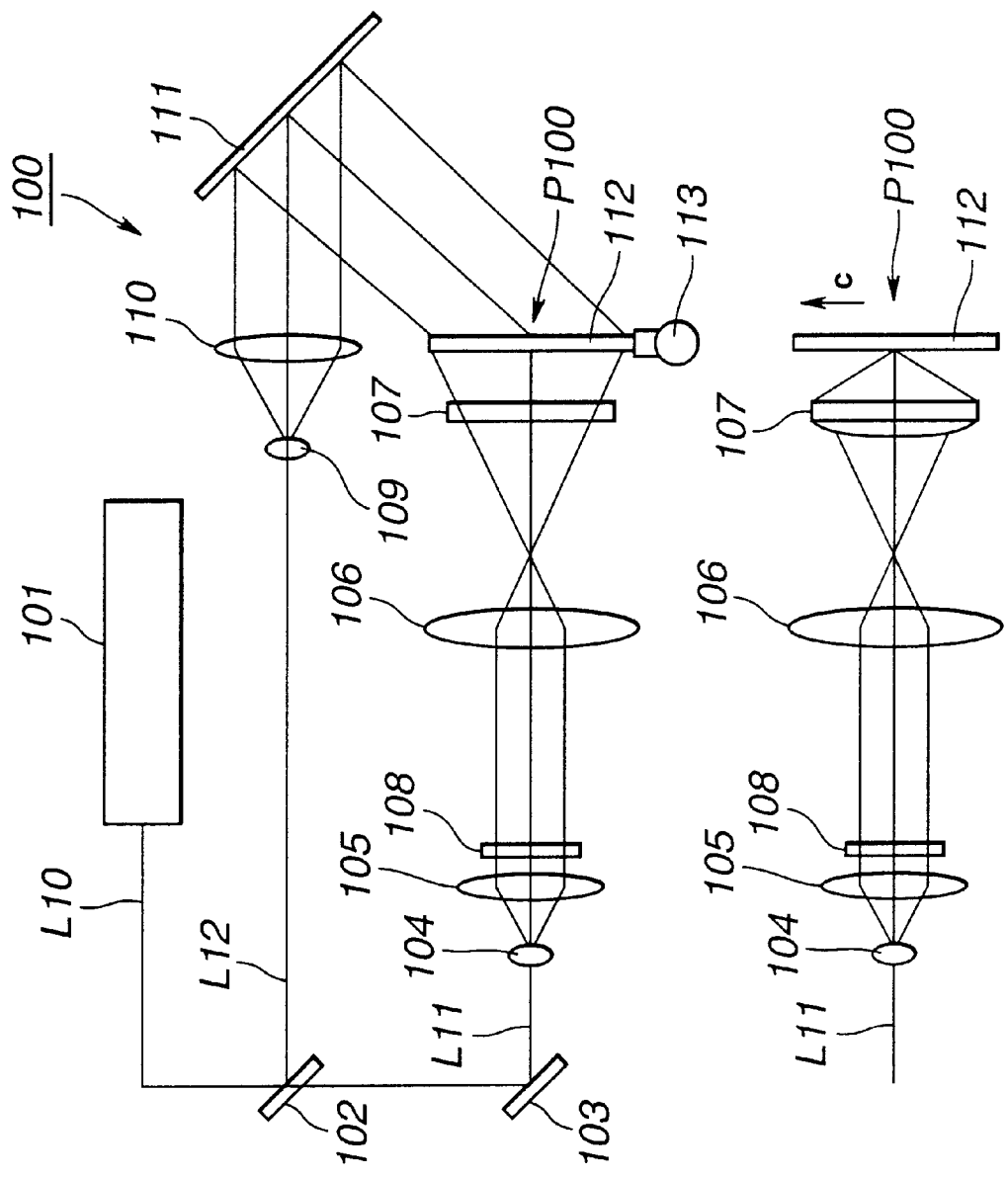
FIGS. 1A and 1B are schematic illustration of the optical system of a known holographic stereogram preparing apparatus.
Figure 2:
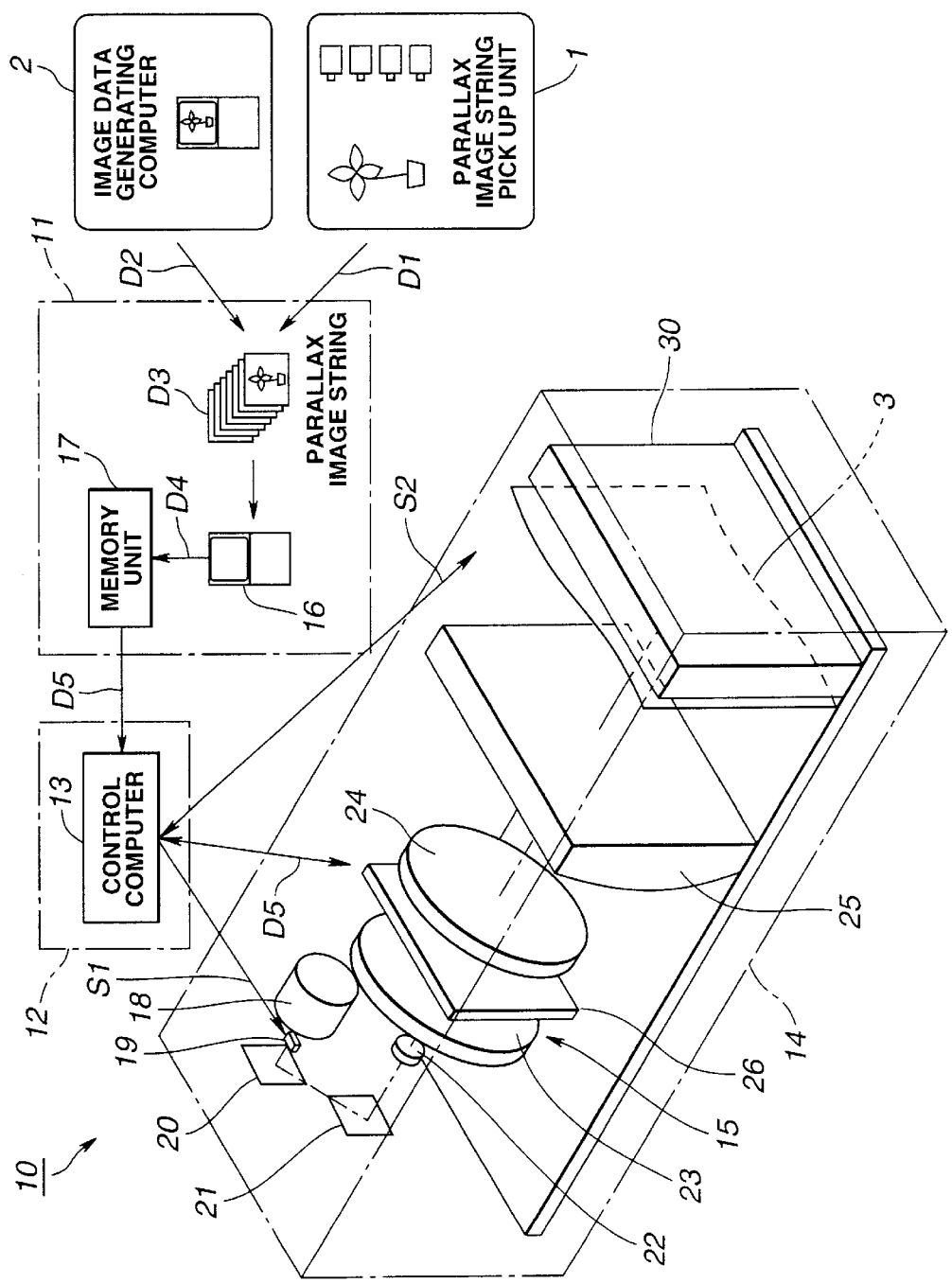
FIG. 2 is a schematic illustration of the overall configuration of a holographic stereogram preparing apparatus for using images picked up by a parallax image string pickup apparatus according to the invention.

Firstly, a holographic stereogram preparing apparatus 10 for preparing a holographic stereogram by using a parallax image string obtained by means of an embodiment of parallax image string pickup apparatus 1 according to the invention, which will be described hereinafter, will be discussed. Referring to FIG. 2, the holographic stereogram preparing apparatus 10 is so designed that it receives at its exposure/recording section P1 an object beam L2 and a reference beam L3 formed on the basis a plurality of strip-shaped element holograms and conducts sequential exposure/recording operations for the interference fringes of the object beam L2 and the reference beam L3, which interference fringes are then recorded on a hologram recording medium to produce a holographic stereogram. The hologram recording medium 3 is typically a photosensitive film that is contained in a film cartridge and intermittently driven to move by a recording medium feed mechanism 30 (not shown).

Figure 3:
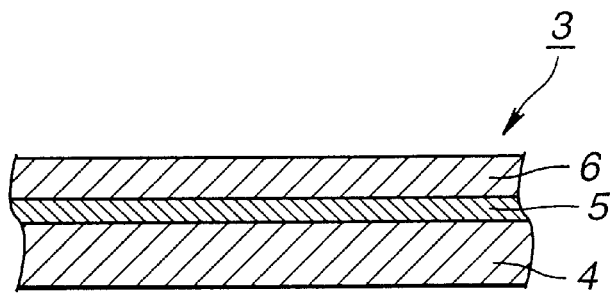
FIG. 3 is a schematic cross sectional view of a principal portion of a recording medium that can be used with the holographic stereogram preparing apparatus of FIG. 1.

As shown in FIG. 3, the hologram recording medium 3 used for the holographic stereogram preparing apparatus 10 is a film application type recording medium comprising a tape-shaped film base member 4, a photopolymer layer 5 made of a photopolymerization type photopolymeric material and formed on the base member 4 and a cover sheet layer 6 arranged on the photopolymer layer 3.

Figure 4A:
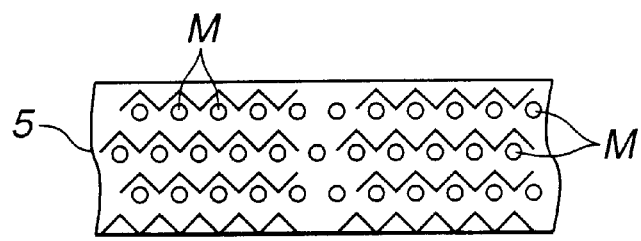
FIGS. 4A through 4C are schematic illustration of the photosensing process of the hologram recording medium of FIG. 3.
Figure 4B:
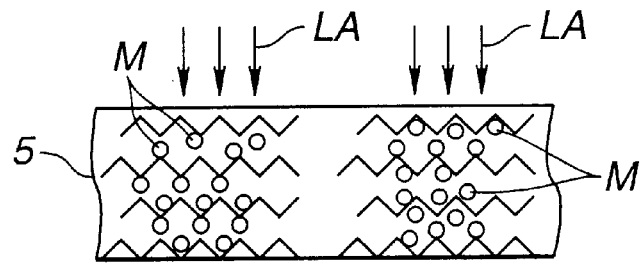
Figure 4C:
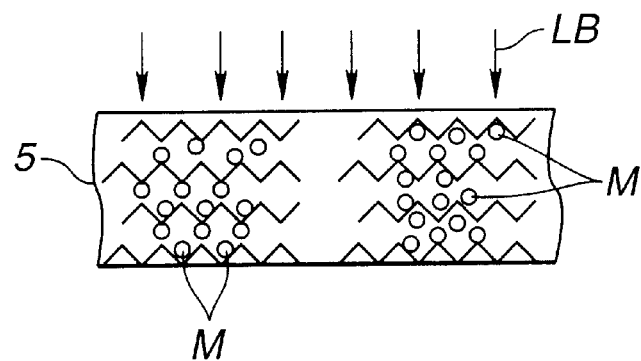

Now, the principle underlying the exposure/recording operations to be conducted on the hologram recording medium 3 for the element holograms will be described by referring to FIGS. 4A through 4C. As shown in FIG. 4A, the photopolymerization type photopolymer of the photopolymer layer 5 is initially in a state where monomers M are evenly dispersed in the matrix polymer. As the photopolymerization type photopolymer is irradiated with a laser beam LA with a power level of 10 mJ/cm$^2$ to 400 mJ/cm$^2$, the monomers M evenly dispersed in the area of the matrix polymer exposed to light become polymerized as shown in FIG. 4B.

As the monomers M of the photopolymerization type photopolymer are polymerized in the exposed area, the refractive index of the photopolymerization type photopolymer is modulated and differentiated in the exposed area and the unexposed area because monomers M move into the polymerized area from the surrounding area to produce an uneven monomer concentration. Thereafter, as the photopolymerization type photopolymer is irradiated with ultraviolet rays or rays of visible light LB with an power level of 1,000 mJ/cm$^2$ over the entire surface thereof, the monomers M in the matrix polymer are completely polymerized as shown in FIG. 4C. The hologram recording medium 3 records the interference fringes produced by the interference of the object beam L2 and the reference beam L3 as a result of changes in the refractive index that are given rise to by the incident laser beam LA.

A holographic stereogram preparing apparatus 10 that uses a film application type recording medium comprising a photopolymer layer 5 of a photopolymerization type photopolymic material as described above for the hologram recording medium 3 is advantageous in that the recording medium 3 does not require a specific development process after exposure to light. In other words, such a holographic stereogram preparing apparatus 10 may have a simplified configuration and can rapidly prepare a holographic stereogram because it does not require the use of a development unit.

Referring to FIG. 2, a holographic stereogram preparing apparatus comprises an image data processing section 11 for processing image data of the object of exposure/recording operations, a control section 12 including a control computer 13 for controlling the overall operation of the apparatus and a holographic stereogram preparing section 14 including an optical system for preparing holographic stereograms.

The image processing section 11 has an image processing computer 16 and a memory unit 17 and generates a parallax image string D3 on the basis of a large number of picked up images D1 containing parallax information and supplied from a parallax image string pickup apparatus 1 and a large number of computer images D2 containing parallax information and supplied from an image data generating computer 2.

The picked up images D1 are a plurality of images obtained by shooting an object successively by means of a moving camera or simultaneously by means of a multiocular camera and contain parallax information. The computer images D2 are a plurality of images prepared by means of a CAD (computer aided design) system or a CG (computer graphics) system and contain parallax information.

The image processing section 11 generates hologram images D4 by carrying out a predetermined processing operation for preparing a holographic stereogram on the parallax image string D3 by means of the image processing computer 16 as will be discussed in greater detail hereinafter. The generated hologram images D4 are then temporarily stored in the memory unit 17 that may be a computer memory or a hard disk. The image processing section 11 reads out an element hologram image D4 at a time and transmits it to the control computer 13 of the control section 12 as the element hologram images D5 stored in the memory unit 17 are taken out on one by one basis during the exposure/recording operation for recording the element hologram images on the hologram recording medium 3.

The control computer 13 drives the holographic stereogram preparing section 14 and controls the components of the holographic stereogram preparing section 14 in a manner as will be described hereinafter. More specifically, the control computer 13 controls the holographic stereogram preparing apparatus 10 in such a way that the latter carries out an exposure/recording operation on each of the displayed element images formed on the basis of the element hologram images D5 supplied from the image processing section 11 and records it on the hologram recording medium 3 arranged in part of the holographic stereogram preparing section 14 as a strip-shaped element hologram.

The holographic stereogram preparing section 14 comprises various optical components of optical system 15.

Referring now to FIG. 5, the optical system 15 comprises an optical system 15A for incident light, an optical system 15B for the object beam and an optical system 15C for the reference beam. The optical system 15B for the object beam and the optical system 15C for the reference beam have respective optical path lengths down to the exposure/recording section P1 that are substantially equal to each other.

The optical system 15A for incident light has a laser beam source 18 for emitting a laser beam L1, a shutter mechanism 19 adapted to transmit or block the laser beam L1 so as to operate like a switch and a half mirror 20 for dividing the laser beam L1 into an object beam L2 and a reference beam L3.

The laser beam source 18 typically comprises a semiconductor excitation YAG laser unit, an air-cooling argon ion laser unit or an air-cooling krypton laser unit.

The shutter mechanism 19 is driven to become open or closed by the control output S1 of the control computer 13 produced at the output timing of each element hologram image D5 and allow the laser beam L1 to enter the hologram recording medium 3 located in the exposure/recording section P1 by way of a downstream optical system or block the optical path of the laser beam L1 to the hologram recording medium 3.

The half mirror 20 divided the incident laser beam L1 into a transmitted beam and a reflected beam. The transmitted beam of the laser beam L1 is used as object beam L2, whereas the reflected beam of the laser beam L1 is used as reference beam L3. The object beam L2 and the reference beam L3 are made to respectively enter the optical system 15B for the object beam and the optical system 15C for the reference beam arranged downstream relative to it.

The optical system 15B for the object beam specifically comprises a total reflection mirror 21, a first cylindrical lens 22, a collimator lens 23, a projection lens 24 and a second cylindrical lens 25. These components are arranged along the optical path of the object beam L2 in the above mentioned order.

The first cylindrical lens 22 is a combination of a convex lens and a pin hole. It is used to one-dimensionally disperse the object beam L2 transmitted through the half mirror 20 and reflected by the total reflection mirror 21 as a function of the width of the display screen of the transmission type liquid crystal display device 26, which will be described hereinafter.

The collimator lens 23 collimates the object beam L2 dispersed by the first cylindrical lens 22 and leads the collimated beam to the transmission type liquid crystal display device 26.

The projection lens 24 projects the object beam L2 onto the second cylindrical lens 25.

The second cylindrical lens 25 laterally converges the collimated object beam L2 in the exposure/recording section P1.

In the optical system 15B for the object beam, the transmission type liquid crystal display device 26 is arranged between the collimator lens 23 and the projection lens 24. The transmission type liquid crystal display device 26 sequentially displays the element hologram images on the basis of the element hologram image data D5 output from the control computer 13.

The control computer 13 controls the operation of feeding the hologram recording medium 3 and also the operation of transmitting the drive output S2 to the recording medium feed mechanism 30 of the hologram recording medium 3 in response to the output timing of the element hologram image data D5.

The optical system 15C for the reference beam comprises a cylindrical lens 27, a collimator lens 28 and a total reflection mirror 29. These optical components are arranged along the optical axis of the reference beam L3 in the above mentioned order.

The cylindrical lens 27 is a combination of a convex lens and a pin hole like the above described first cylindrical lens 22 of the optical system 15B for the object beam. It is used to one-dimensionally disperse the reference beam L3 reflected by the half mirror 20 as a function of the width of the display screen of the transmission type liquid crystal display device 26.

The collimator lens 28 collimates the reference beam L3 dispersed by the cylindrical lens 27.

The total reflection mirror 29 reflects the reference beam L3 to make it strike the hologram recording medium 3 of the exposure/recording section P1 from behind.

As pointed out above, the object beam L2 of the laser optical system 15B and the reference beam L3 of the laser optical system 15C produced by dividing the incident laser beam L1 by means of the half mirror 20 of the optical system 15 have respective optical path lengths down to the exposure/recording section P1 that are substantially equal to each other. Thus, the object beam L2 and the reference beam L3 are highly coherent relative to each other and hence adapted to produce a holographic stereogram that can be used to reproduce a sharp image.

As described above, the holographic stereogram preparing apparatus 10 comprises a recording medium feed mechanism 30 for intermittently feeding the hologram recording medium 3 by an element hologram in the direction indicated by arrow a in FIG. 5B. The recording medium feed mechanism 30 intermittently drives the hologram recording medium 3 to move forward according to the drive output S2 coming from the control computer 13. The holographic stereogram preparing apparatus 10 then operates the shutter mechanism 19 to open the optical path of the laser beam L1 according to the control output S1 transmitted from the control computer 13. The timing of transmitting the control output S1 of the control computer 13 is interlocked with the operation of the recording medium feed mechanism 30.

With the holographic stereogram preparing apparatus 10 having a configuration as described above, the control computer 13 of the control section 12 transmits a drive output S2 to drive the hologram recording medium 3 to move forward by a distance corresponding to an element hologram each time when an exposure/recording operation is completed for an element image so that an unexposed area is placed vis-a-vis the exposure/recording section P1.

Then, the shutter mechanism 19 of the holographic stereogram preparing apparatus 10 is opened to allow the object beam L2 and the reference beam L3 that have been modulated to strike the hologram recording medium 3 of the exposure/recording section 1 respectively from the front side and the rear side of the hologram recording medium 3 so that an exposure/recording operation of recording interference fringes for an element hologram image is carried out. As the exposure/recording operation of the element image is over, the control computer 13 of the control section 12 of the holographic stereogram preparing apparatus 10 transmits another drive output S2 to the recording medium drive mechanism 30 to drive the hologram recording medium 3 to move forward by a distance corresponding to an element hologram for another time. This sequence of operation of the holographic stereogram preparing apparatus 10 is repeated until a holographic stereogram is completed.

As described above, the parallax image string pickup apparatus 1 picks up images of the object 31 by means of the camera unit 32 that may be a moving type camera or a multiocular type camera and prepares a plurality of picked up images D1 containing parallax information. The object 31 and the camera unit 32 may typically be arranged to show a positional relationship as shown in any of FIGS. 6A through 6D in the parallax image string pickup apparatus 1.

Figure 6A:
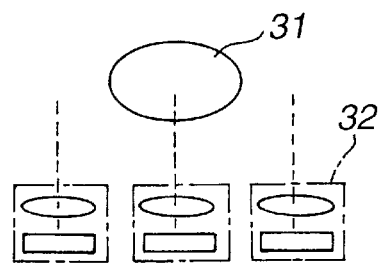
FIGS. 6A through 6D are schematic illustration of the positional relationship of the object and the camera unit of an embodiment of the invention.

FIG. 6A shows a positional relationship (referred to as straight-ahead camera on straight track) where a single camera unit 32 is moved horizontally relative to the object 31 in a predetermined period of time and orientation of the camera unit 32 is not changed with time relative to the object 32. With this mode of operation of the parallax image string pickup apparatus 1, the camera unit 32 does not necessarily always shoot the object 31 during its imaging operation.

Figure 6B:
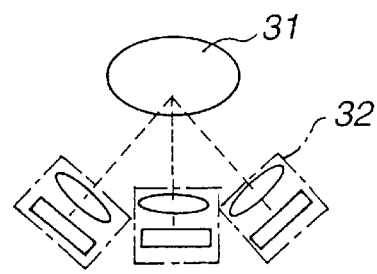

FIG. 6B shows a positional relationship (referred to as panning camera on straight track) where a single camera unit 32 is moved horizontally relative to the object 31 in a predetermined period of time and the orientation of the camera unit 32 is changed with time relative to the object 31. With this mode of operation of the parallax image string pickup apparatus 1, the camera unit 32 is turned horizontally in order to constantly shoot the object 31 as it is driven to move horizontally.

Figure 6C:
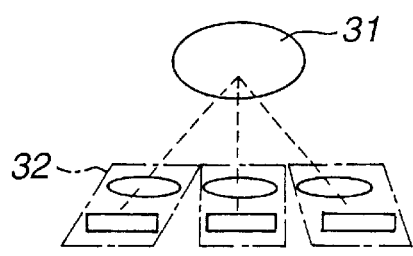

FIG. 6C shows a positional relationship (referred to as re-centering camera on straight track) where a single camera unit 32 is moved horizontally relative to the object 31 in a predetermined period of time and the orientation of the camera unit 32 is not changed with time relative to the object 31 but its orientation is angularly changed to shoot the object 31. With this mode of operation of the parallax image string pickup apparatus 1, while the orientation of the camera unit 32 is not changed relative to the object 31, the image pickup device and other devices in the camera unit 32 is moved in order to constantly shoot the object 31 as it is driven to move horizontally.

Figure 6D:
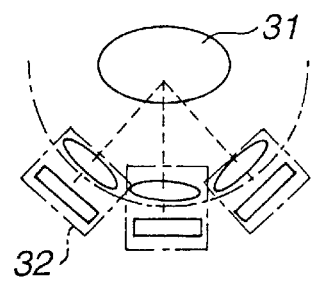
Figure 7:
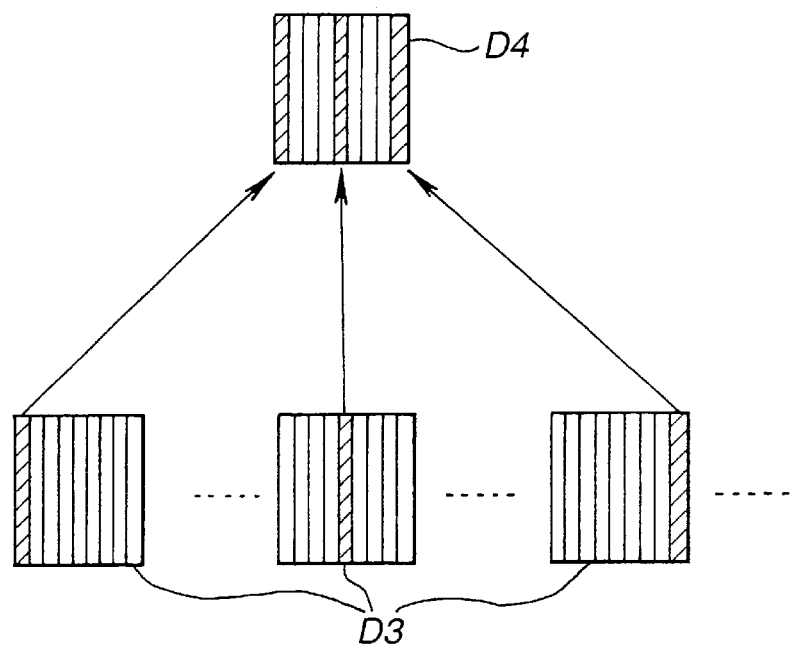
FIG. 7 is a schematic illustration of an image processing operation to be carried out when preparing a holographic stereogram, which is referred to as slice and dice image processing operation.

FIG. 6D shows a positional relationship (referred to as rotating camera, or rotating object if the object 31 is driven to rotate) where a single camera unit 32 is driven to move on a circle and move around the object 31 in a predetermined period of time. With this mode of operation of the parallax image string pickup apparatus 1, the camera unit 32 is driven to move on a circular track to constantly shoot the object 31.

Note that the parallax image string pickup apparatus 1 may alternatively comprise a plurality of camera units 32 that are driven to shoot the object 31 concurrently. Still alternatively, not the camera unit 32 but the object 31 may be driven to move.

The picked up images D1 obtained by the parallax image string pickup apparatus 1 are subjected to a predetermined image processing operation of the image processing section 11. More specifically, the image processing section 11 performs a so-called slice and dice image processing operation of dividing the parallax image string obtained from the picked up images D1 containing parallax information into strip-shaped elements along the direction of parallax to reorganize strip-shaped image data for different parallax images in order to produce a hologram image D4. As a result of this slice and dice image processing operation, distortions and blurs specific to a holographic stereogram that involves only lateral parallax can be corrected.

Now, the operation of the parallax image string pickup apparatus 1 in the mode of FIG. 6C where the object 31 and the camera unit 32 are arranged to show the positional relationship of re-centering camera on straight track will be discussed below.

Figure 8:
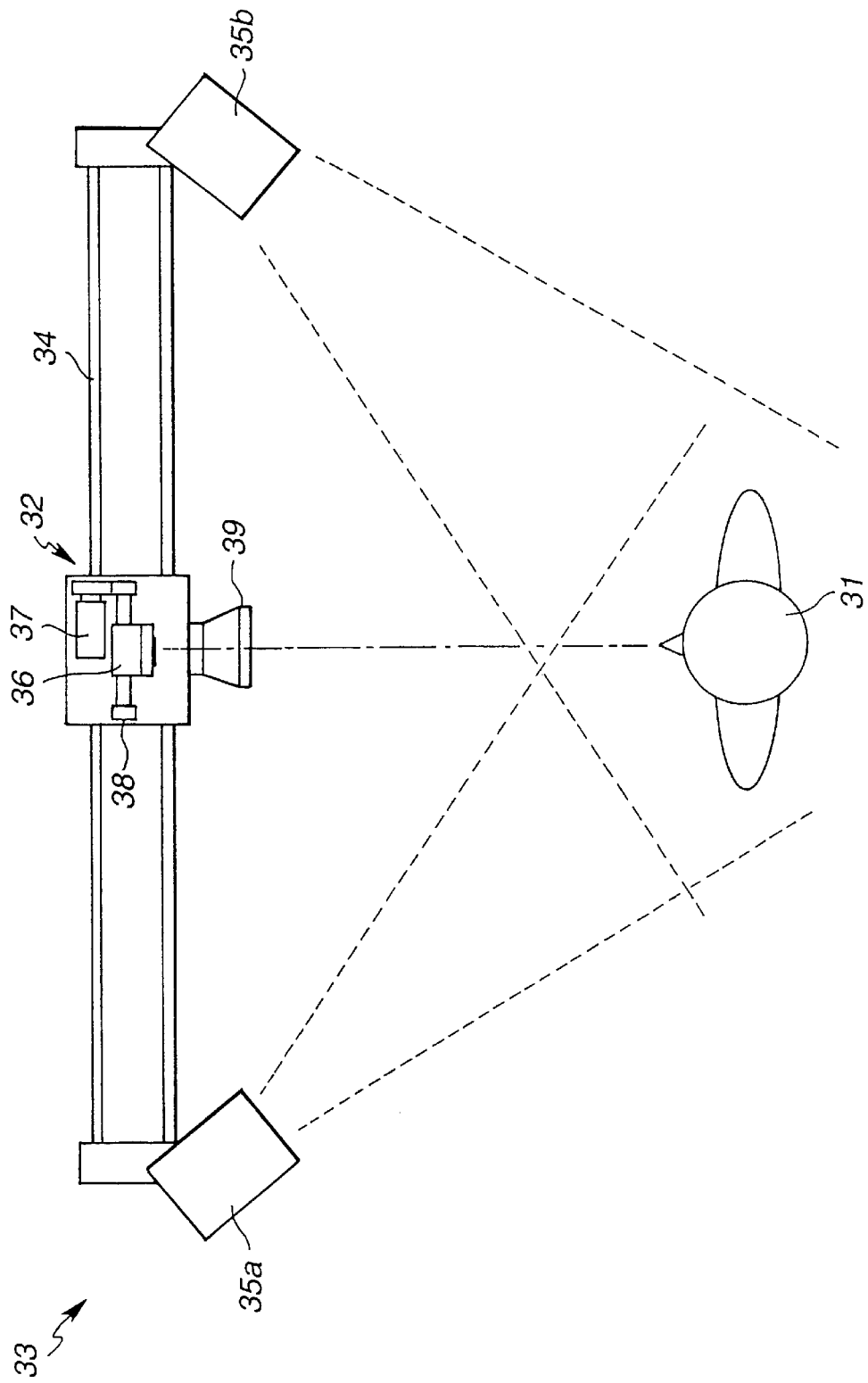
FIG. 8 is a schematic plan view of the image pickup unit of an embodiment of parallax image string pickup apparatus according to the invention and an object being shot by it.

The image pickup unit 33 of the parallax image string pickup apparatus 1 comprises a camera unit 32, a camera unit feed mechanism 34 and illumination light sources 35a, 35b for illuminating the object 31 when the latter is being shot as shown in FIG. 8.

The camera unit 32 typically comprises a ⅔-inch CCD camera 36, a camera feed mechanism 38 driven by a stepping motor 37 and an imaging lens 39. The camera 32 is mounted on the camera unit feed microscope 38 having a predetermined length that may typically be 2,700 mm.

As an imaging operation is started, the parallax image string pickup apparatus 1 drives the camera unit feed mechanism 34 by means of a stepping motor (not shown). Then, the camera unit 32 moves horizontally as the camera unit feed mechanism 34 is driven to operate.

Figures 9A, 9B, 9C:
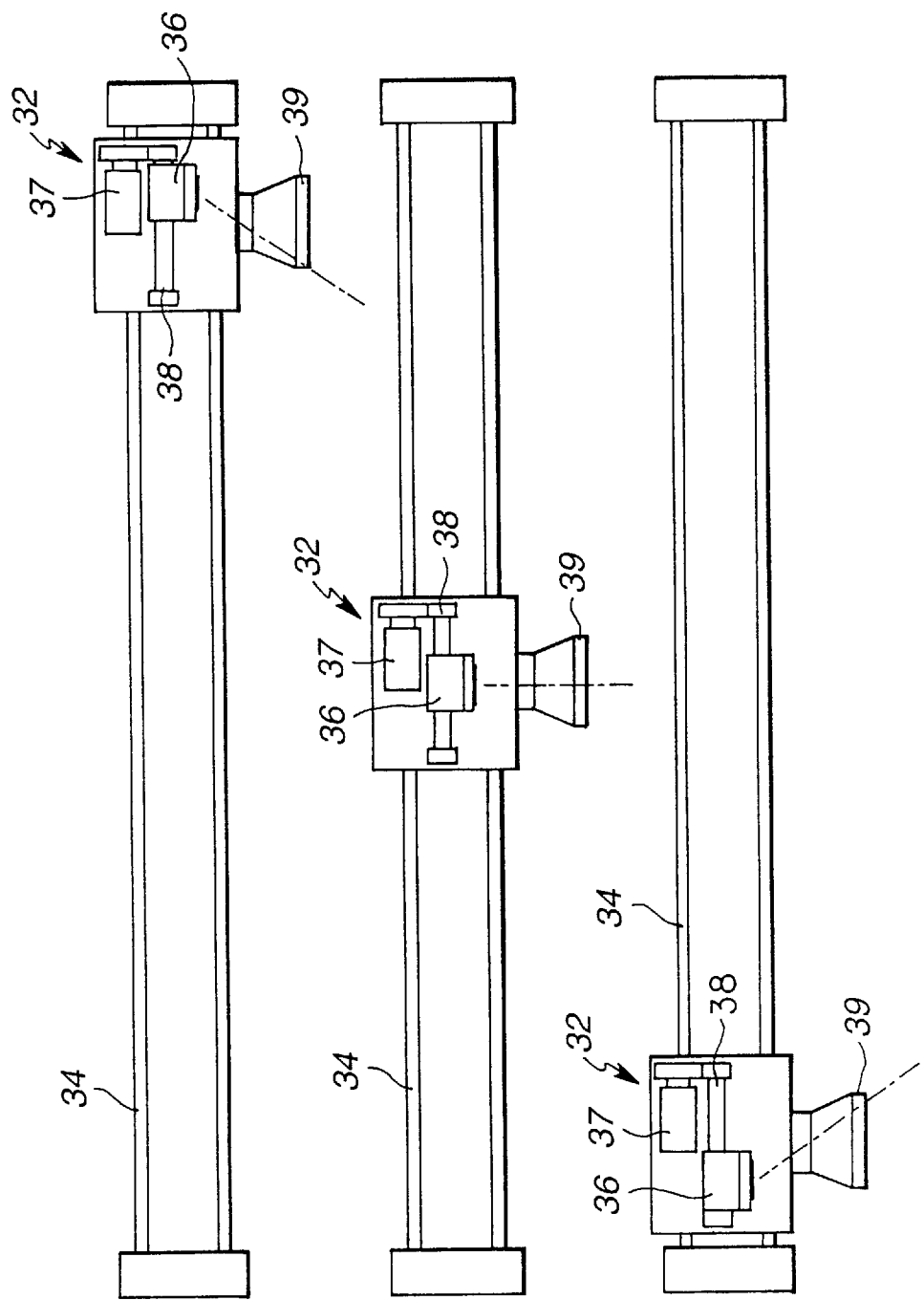
FIG. 9 is a schematic plan view of the camera unit and the camera feeding mechanism of the embodiment of FIG. 8, illustrating the concept underlying the horizontal movement of the camera unit in the case of re-centering camera on straight track.

In the parallax image string pickup apparatus 1, the camera feed mechanism 38 arranged inside the camera unit 32 is also driven in synchronism with the movement of the camera unit feed mechanism 34 that is driven by the stepping motor 37. Therefore, the CCD camera 36 arranged inside the camera unit 32 is driven to move horizontally as shown in FIGS. 9A through 9C by the camera feed mechanism 38. Thus, in the mode of operation where the object 31 and the camera unit 32 show the positional relationship of re-centering camera on straight track, the CCD camera 36 can shoot the center of the object 31 through the imaging lens 39 if the camera unit 32 is moved horizontally.

With the parallax image string pickup apparatus 1, a half mirror 40 is arranged between the object 31 and the camera unit 32. In other words, the camera unit 32 is arranged within a space surrounded by upper and lower substrate 42, 41, a lateral wall 43 and the half mirror 40.

Under this condition of the parallax image string pickup apparatus 1, the object 31 can hardly see the camera unit 32 because the camera unit 32 is blocked by the half mirror 40. Therefore, the parallax image string pickup apparatus 1 can pick up a large number of images D1 containing parallax information for the object while the object is not aware of the movement of the camera unit 32.

The half mirror 40 of the parallax image string pickup apparatus 1 is used to show an image of the object 31 so that the object 31 may see him- or herself during the shooting operation. Therefore, with the parallax image string pickup apparatus 1, the object 31 would not unnecessarily move because the gaze of the object 31 is attracted to his or her own image on the half mirror 40 during the shooting operation so that consequently high quality images D1 will be obtained as a result of the shooting operation.

It will be appreciated that the half mirror does not necessarily show an image of the object 31. It may alternatively show a picture or a painting that attracts the gaze of the object 31.

Still alternatively, the half mirror 40 may be used to show an image that can predict the finished holographic stereogram. With such an arrangement, the object 31 may be able to know his or her position in the frame of the viewfinder of the camera and/or other shooting conditions.

Now, another embodiment of parallax image string pickup apparatus according to the invention will be described by referring to FIG. 11.

Figure 10:
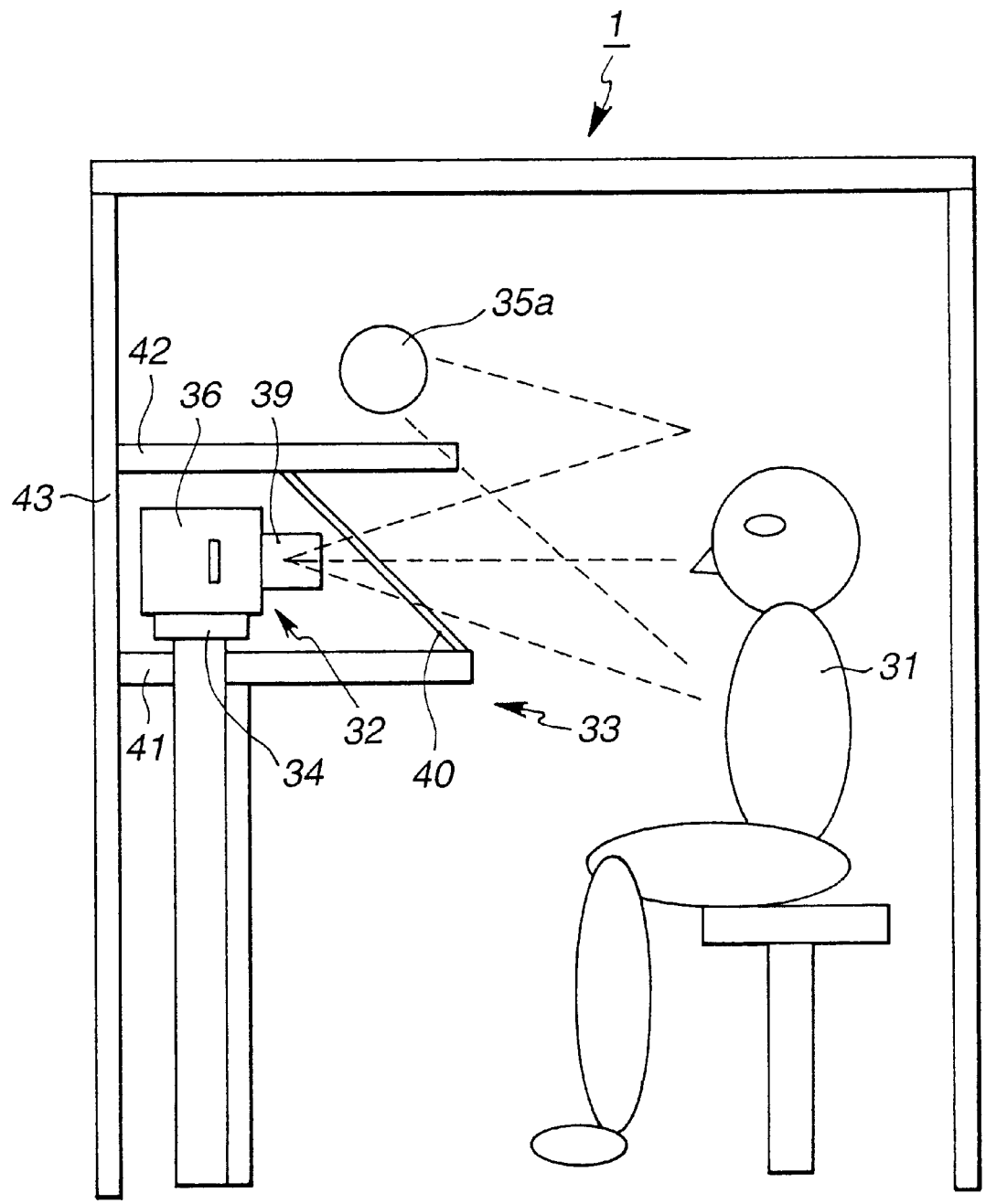
FIG. 10 is a schematic lateral view of a parallax image string pickup apparatus according to the invention and an object, where a half mirror is arranged between the object and the camera unit of the apparatus to produce an image of the object on the half mirror.
Figure 11:
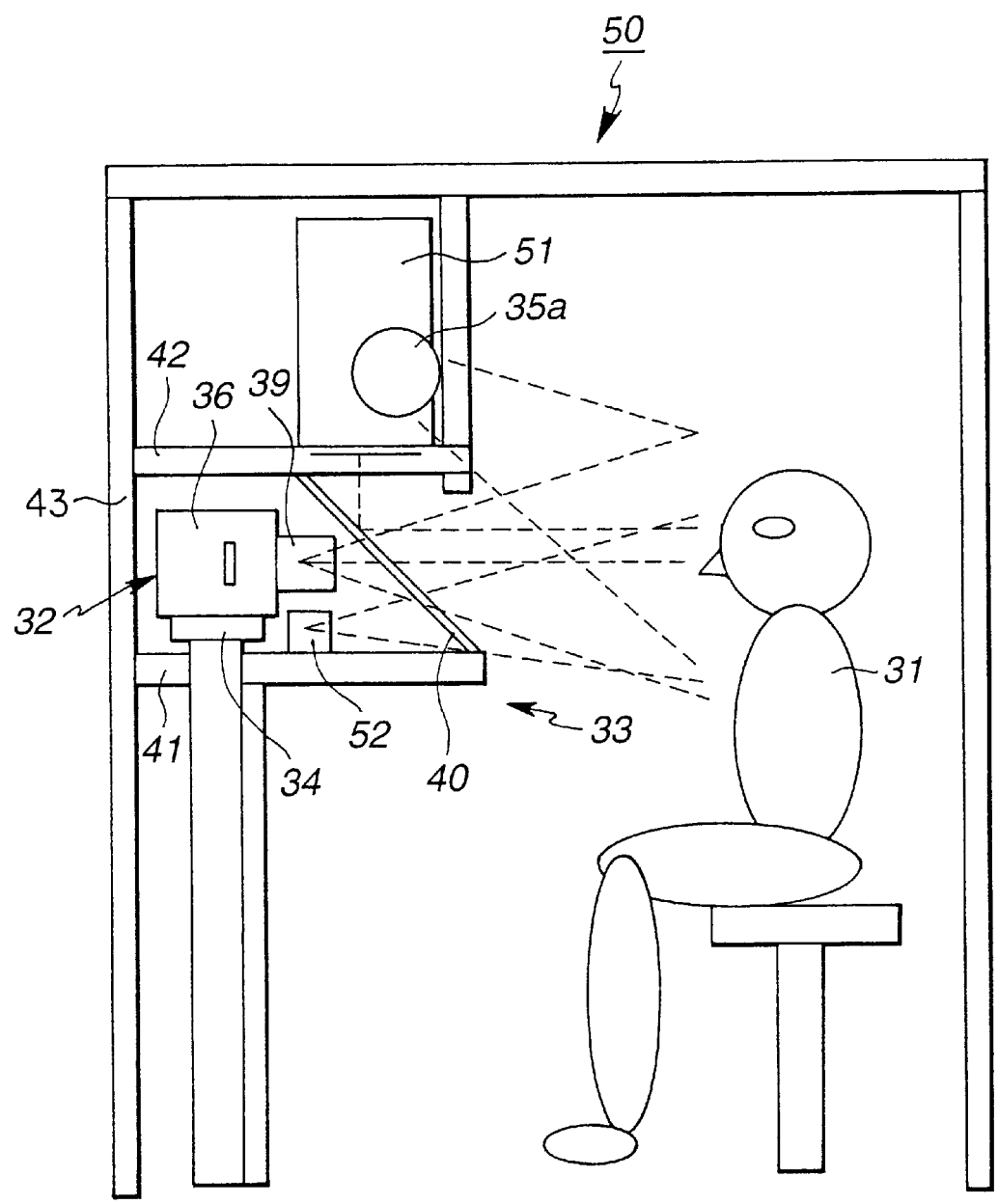
FIG. 11 is a schematic lateral view of a parallax image string pickup apparatus according to the invention and an object, where a half mirror is arranged between the object and the camera unit of the apparatus and a monitor screen is arranged thereabove to produce the image of the monitor screen on the half mirror.

The basic configuration of the parallax image string pickup apparatus 50 shown in FIG. 11 is similar to that of FIG. 10 but characterized in that a monitor screen 51 is provided. The components of the parallax image string pickup apparatus 50 that are same or similar to those of the parallax image string pickup apparatus 1 of FIG. 10 are denoted by the same reference symbols in FIG. 11 and will not be described here any further. It may be needless to say that the parallax image string pickup apparatus 50 is used to obtain images D1 to be used for a holographic stereogram preparing apparatus 10.

Referring to FIG. 11, the parallax image string pickup apparatus 50 is provided with a monitor screen 51 arranged in an upper area of the lateral wall 42. The monitor screen 51 is used to display a front view of the object 31 along with conditions necessary to the shooting operation including an expected image of the holographic stereogram to be produced, the images to be synthetically combined with his or her images for the holographic stereogram and his or her position in the frame of the viewfinder of the camera that the object 31 may recognize before the shooting operation.

For the operation of shooting the object 31, the CCD camera may be moved to the position shown in FIG. 9B before the start of the shooting operation or another CCD camera 52 may be arranged in front of the object 31 to shoot him or her.

The image displayed on the monitor screen 51 during the shooting operation for obtaining images D1 may be a still picture taken before the start of the shooting operation or the front view of the object 31 being taken during the shooting operation for obtaining images D1.

Alternatively, the monitor screen 51 may be so arranged as to sequentially display the images D1 of the object 31 containing parallax information obtained by the shooting operation instead of displaying a front view of the object 31.

With the above described arrangement of the parallax image string pickup apparatus 50, a large number of images D1 of the object 31 containing parallax information can be obtained without making the object 31 nervous about the movement of the camera unit 32 because the gaze of the object 31 will be attracted to the image of his- or herself on the monitor screen and hence the object 31 would not unnecessarily move. Thus, the parallax image string pickup apparatus 50 can produce high quality images D1.

Additionally, with the parallax image string pickup apparatus 50, the object 31 can collect information necessary for the shooting operation including his or her position in the frame of the viewfinder of the camera and other shooting conditions.

Still additionally, with the parallax image string pickup apparatus 50, it is possible to predict the finished holographic stereogram when preparing the holographic stereogram by synthetically combining the obtained images with other images.

Figure 12:
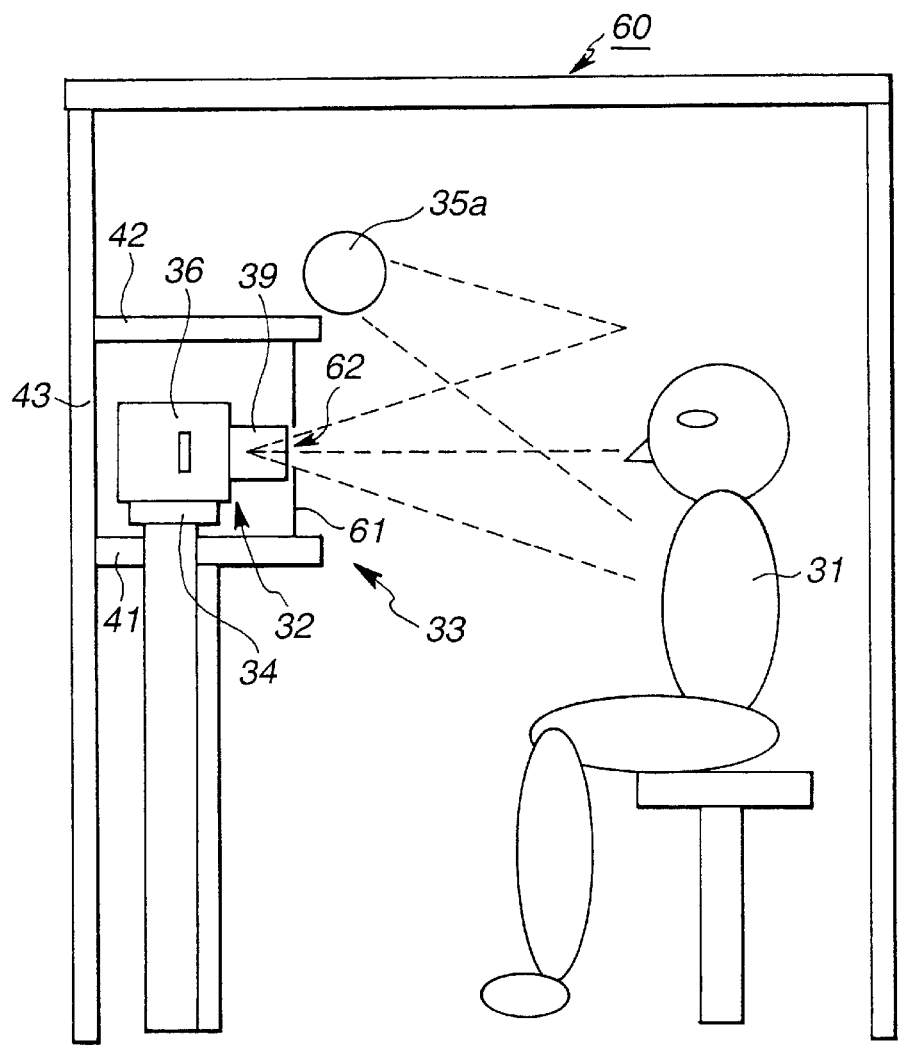
FIG. 12 is a schematic lateral view of a parallax image string pickup apparatus according to the invention and an object, where a total reflection mirror having an imaging aperture is arranged between the object and the camera unit of the apparatus to produce an image of the object on the total reflection mirror.
Figure 13:
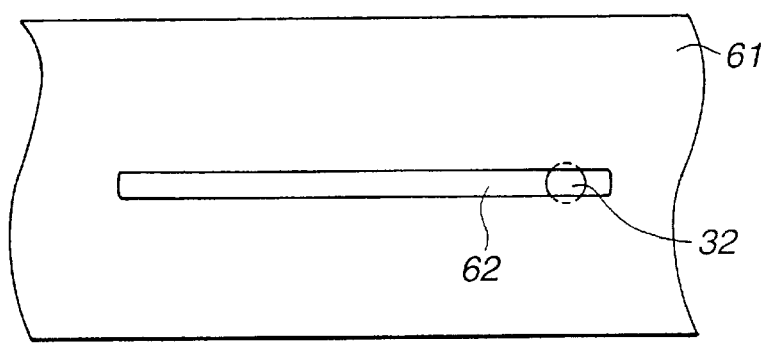
FIG. 13 is a schematic front view of the total reflection mirror of FIG. 10, showing the imaging aperture arranged on the total reflection aperture and the camera unit.

FIGS. 12 and 13 show still other embodiments of parallax image string pickup apparatus according to the invention.

The embodiment of parallax image string pickup apparatus 60 shown in FIG. 12 has a basic configuration similar to that of FIG. 10 but the half mirror 44 of FIG. 10 is replaced by a total reflection mirror 61 in FIG. 12. Thus, the components of the parallax image string pickup apparatus 60 that are same or similar to those of the parallax image string pickup apparatus 1 of FIG. 10 are denoted by the same reference symbols in FIG. 12 and will not be described here any further. It may be needless to say that the parallax image string pickup apparatus 60 is used to obtain images D1 to be used for a holographic stereogram preparing apparatus 10.

Referring to FIG. 12, the parallax image string pickup apparatus 60 is provided with a total reflection mirror 61 arranged between the object 31 and the camera unit 32. The total reflection mirror 61 is provided with an imaging aperture 62 so that the CCD camera 36 of the camera unit 32 may shoot the object 31 therethrough.

As shown in FIG. 13, the imaging aperture 62 has a length sufficient to cover the horizontal translation of the camera unit 32 and a width necessary for the CCD camera 36 to shoot the object 31.

With the use of a total reflection mirror 61 having the above described configuration, the object 31 can hardly see the camera unit 32 arranged within a space defined by upper and lower substrates 42, 41, a lateral wall 43 and the total reflection mirror 61 so that he or she would not become nervous about the movement of the camera unit 32 during the shooting operation.

The total reflection mirror 61 of the parallax image string pickup apparatus 60 is used to show an image of the object 31 so that the object 31 may see him- or herself during the shooting operation. The parallax image string pickup apparatus 60 may additionally be provided with a monitor screen as in the case of the parallax image string pickup apparatus 50 shown in FIG. 11 so that the image on the monitor screen may be displayed on the total reflection mirror 61.

Thus, with the parallax image string pickup apparatus 60 having a configuration as described above, the object 31 would not become nervous about the movement of the camera unit 32 and the object 31 would not unnecessarily move because the gaze of the object 31 is attracted to his or her own image on the half mirror 40 during the shooting operation so that consequently high quality images D1 will be obtained as a result of the shooting operation.

The profile of the imaging aperture 62 of the parallax image string pickup apparatus 60 is not limited to the one described above and may be modified appropriately so long as the camera unit 32 can shoot the object 31 therethrough.

It will be appreciated that the total reflection mirror 61 does not necessarily show an image of the object 31. It may alternatively show a picture or a painting that attracts the gaze of the object 31. Still alternatively, the total reflection mirror 61 may be used to show an image that can predict the finished holographic stereogram. With such an arrangement, the object 31 may be able to know his or her position in the frame of the viewfinder of the camera and/or other shooting conditions.

Figure 14:
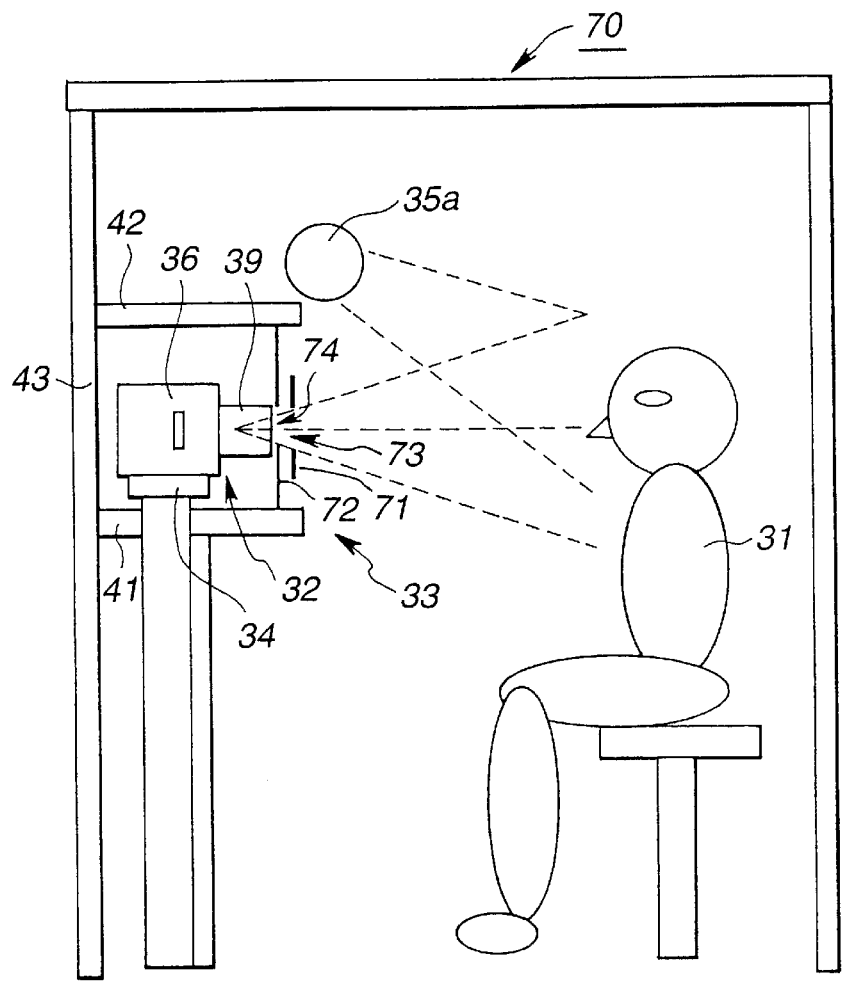
FIG. 14 is a schematic lateral view of a parallax image string pickup apparatus and an object, where a stationary type total reflection mirror having an imaging aperture and a movable type total reflection mirror having a slit-shaped aperture are arranged between the object and the camera unit of the apparatus.
Figure 15:
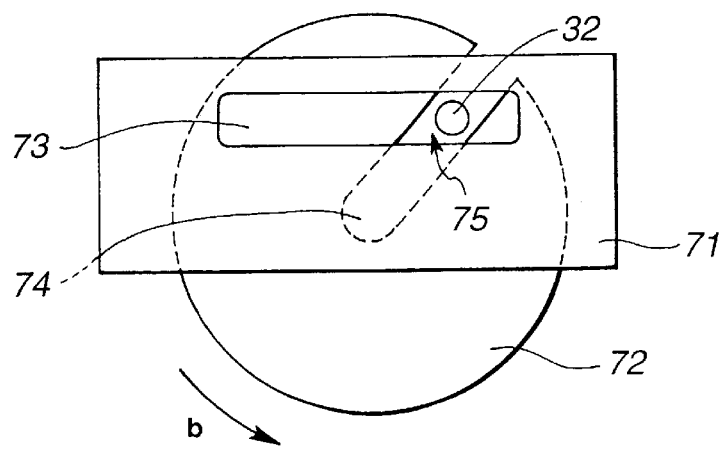
FIG. 15 is a schematic front view of a stationary type total reflection mirror and a movable type total reflection mirror, illustrating the imaging aperture of the stationary type total reflection mirror, the slit-shaped aperture of the movable type total reflection mirror and the camera unit.

FIGS. 14 and 15 show still other embodiments of parallax image string pickup apparatus according to the invention.

The embodiment of parallax image string pickup apparatus 70 shown in FIG. 14 has a basic configuration similar to that of FIG. 10 but a pair of total reflection mirrors 14 arranged therein. Thus, the components of the parallax image string pickup apparatus 70 that are same or similar to those of the parallax image string pickup apparatus 1 of FIG. 10 are denoted by the same reference symbols in FIG. 14 and will not be described here any further. It may be needless to say that the parallax image string pickup apparatus 70 is used to obtain images D1 to be used for a holographic stereogram preparing apparatus 10.

Referring to FIG. 14, the parallax image string pickup apparatus 70 is provided with a stationary total reflection mirror 71 and a movable total reflection mirror 72 arranged in series between the object 31 and the camera unit 32.

The stationary total reflection mirror 71 of FIG. 15 is provided with an imaging aperture 73 so that the CCD camera 36 of the camera unit 32 may shoot the object 31 therethrough. The profile of the imaging aperture 73 of the stationary total reflection mirror 73 is similar to that of the imaging aperture 62 of the total reflection mirror 61 of the parallax image string pickup apparatus 60 shown in FIG. 13.

On the other hand, the movable total reflection mirror 72 is disk-shaped and is driven to rotate in the direction of arrow b in FIG. 14 by means of a drive mechanism (not shown) in synchronism with the horizontal movement of the camera unit 32. Additionally, the movable total reflection mirror 72 is provided with a slit-shaped notched section 74 that is extending radially.

In the parallax image string pickup apparatus 70, the camera unit 32 is constantly located at the aperture 75 formed as the notched section 74 of the movable total reflection mirror 72 that is driven to rotate in synchronism with the movement of the camera unit 32 and the imaging aperture 73 of the stationary total reflection mirror 71 intersect each other. In other words, with the parallax image string pickup apparatus 70, the aperture 75 appears to be moving with the camera unit 32.

With the use of total reflection mirrors 71, 72 having the above described respective configurations, the object 31 can hardly see the camera unit 32 nor would become nervous about the movement of the camera unit 32 during the shooting operation.

The stationary total reflection mirror 71 and the movable total reflection mirror 72 of the parallax image string pickup apparatus 70 are used to show an image of the object 31 so that the object 31 may see him- or herself during the shooting operation as in the case of the parallax image string pickup apparatus 60 shown in FIG. 12. The parallax image string pickup apparatus 70 may additionally be provided with a monitor screen as in the case of the parallax image string pickup apparatus 50 shown in FIG. 11 so that the image on the monitor screen may be displayed on the stationary total reflection mirror 71 and the movable total reflection mirror 72.

Thus, with the parallax image string pickup apparatus 70 having a configuration as described above, the object 31 would not become nervous about the movement of the camera unit 32 and the object 31 would not unnecessarily move because the gaze of the object 31 is attracted to his or her own image during the shooting operation so that consequently high quality images D1 will be obtained as a result of the shooting operation.

The profile of the stationary total reflection mirror 71 including that of the imaging aperture 73 and the profile of the movable total reflection mirror 72 including that of the notched section 74 are not limited to those described above and may be modified appropriately so long as the camera unit 32 is made invisible from the object 31 and the camera unit 32 can shoot the object 31 therethrough.

It will be appreciated that the stationary total reflection mirror 71 and the movable total reflection mirror 72 do not necessarily show an image of the object 31.

They may alternatively show a picture or a painting that attracts the gaze of the object 31 as in the case of the parallax image string pickup apparatus 1. Still alternatively, the total reflection mirrors 71, 72 may be used to show an image that can predict the finished holographic stereogram. With such an arrangement, the object 31 may be able to know his or her position in the frame of the viewfinder of the camera and/or other shooting conditions.

While a parallax image string pickup apparatus according to the invention is described above by way of embodiments, the present invention is by no means limited to the above embodiments and the half mirror 44 and the monitor screen 51 may be arranged to show different images.

Additionally, the above described embodiments may be altered or modified without departing from the scope of the invention. For example, some of all of the above described embodiments may be combined in may different ways.

It will be appreciated that the object 31 and the camera unit 32 may show a positional relationship other than that of re-centering camera on straight track in a parallax image string pickup apparatus according to the invention.

The above described holographic stereogram preparing apparatus is adapted for exposure/recording operations for holographic stereograms containing only lateral parallax information (so-called horizontal parallax only). However, it may be needless to say that the present invention is applicable to holographic stereograms containing both lateral and longitudinal parallax information (so-called full parallax). Such a holographic stereogram preparing apparatus is configured in such a way that the object beam L2 and the reference beam L3 are converged to not a strip-shape but to a dot-shape and the hologram recording medium 3 is two-dimensionally moved relative to the converging position for total exposure. Then, while the camera unit of the parallax image string pickup apparatus is driven to move two-dimensionally, the object 31 may be made not to become nervous about the movement of the camera unit 32 typically by arranging a half mirror between the object 31 and the camera unit 32 to screen the camera unit 32 from the object 31.

Still additionally, while the above described holographic stereogram preparing apparatus is designed to perform exposure/recording operations to record black and white element hologram images on the hologram recording medium 3, the present invention is by no means limited to the use of such a holographic stereogram preparing apparatus. For example, a holographic stereogram preparing apparatus to be used for the purpose of the present invention may comprise laser beam sources for the three primary colors of red, green and blue, optical systems for those laser beam sources and a color liquid crystal display device so that the synthetically combined element hologram images may be recorded in color on the hologram recording medium 3.

While a parallax image string pickup apparatus according to the invention is described above in terms of preparing holographic stereograms, the present invention is by no means limited thereto and it may be applied to operations of preparing multiocular images such as lenticular type stereo images. Additionally, a parallax image string pickup apparatus according to the invention is applicable to a multiocular stereo display that can display not only still images but also moving pictures.

What is claimed is:

1. A parallax image string pickup apparatus adapted to generate a parallax image string by shooting an object from a plurality of different angles, said apparatus comprising:
   image pickup means for picking up parallax images of the object; and
   cover-up means to be arranged between the object and the image pickup means for covering up the image pickup means.

2. The parallax image string pickup apparatus according to claim 1, wherein said cover-up means includes a half mirror adapted to display an image of the object.

3. The parallax image string pickup apparatus according to claim 1, wherein said cover-up means includes a total reflection mirror adapted to display an image of the object.

4. The parallax image string pickup apparatus according to claim 1, wherein said cover-up means is provided with an aperture for securing a visual field for the image pickup means.

5. The parallax image string pickup apparatus according to claim 4 wherein said aperture of said cover-up means is adapted to move according to a movement of said image pickup means.

6. The parallax image string pickup apparatus according to claim 1, further comprising a monitor means and said cover-up means is adapted to show the image being displayed on said monitor means.

7. The parallax image string pickup apparatus according to claim 6, wherein said monitor means is adapted to sequentially display parallax images of the object being shot by said image pickup means.

8. The parallax image string pickup apparatus according to claim 6, wherein said monitor means is adapted to display an image of the object taken from the front thereof.

9. The parallax image string pickup apparatus according to claim 8, wherein said image of the object taken from the front thereof is picked up by said image pickup means.

10. The parallax image string pickup apparatus according to claim 8, wherein said image of the object taken from the front thereof is picked up by another image pickup means different from said image pickup means.

* * * * *